Feb. 12, 1929.

Re. 17,210

F. J. BRAINARD

BASKET HANDLE

Original Filed June 30, 1926

Inventor
Forest J. Brainard
by Barton A. Beard
Attorney

Reissued Feb. 12, 1929. Re. 17,210

UNITED STATES PATENT OFFICE.

FOREST J. BRAINARD, OF BROCTON, NEW YORK.

BASKET HANDLE.

Original No. 1,620,941, dated March 15, 1927, Serial No. 119,673, filed June 30, 1926. Application for reissue filed December 12, 1927. Serial No. 239,600.

This invention relates to an improved basket such as is used in the shipping and sale of fruits or the like and also to improvements in the handle or bail construction for such baskets.

In the wooden baskets having relatively rigidly attached handles of wood, commonly used in the grape and small fruits trade, the construction of such baskets renders the packing, shipping and handling of these things relatively expensive.

One of the objects of my invention is to provide a fruit basket having a readily attachable and detachable handle permitting of shipping of the baskets to the point of packing or use in nested relation one to the other.

A further object is to provide an improved basket having cooperating parts on the basket, cover and handle which will permit very ready application or installation of the handle and which when the handle is in position will prevent removal of the cover or shifting of the cover lengthwise of the basket to expose the contents of the basket.

A further object is to provide a basket as aforesaid in which the handles or bails are adapted to swing or fold downwardly substantially against the cover when the baskets are packed one on top of the other to thereby economize packing or shipping room required and in which the handles or bails when released from the pressure of the superposed baskets will move to vertically extending positions so that they may be readily grasped for purposes of carrying or moving.

A further object is to produce a basket having the above identified characteristics, which is relatively inexpensive to manufacture.

Other objects will appear from the following description and drawing and the appended claims.

Figure 1:
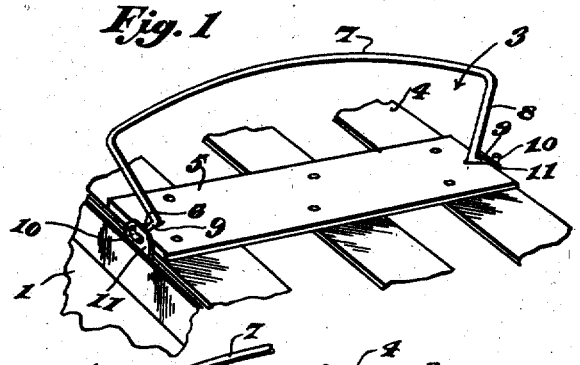
Fig. 1 is a perspective view of a portion of a fruit basket showing a form of the invention with the cover in closed position on the basket.

Referring to the drawings, 1 designates a side wall of the basket which may be of any suitable size or shape, and 2 designates the usual laminated rim at the top of the side of the basket.

3 designates the cover. In the form of cover shown, this is made up of the spaced longitudinally disposed slats 4 connected together by transverse cleats 5.

The cover is provided with parts cooperating with a portion of the handle to hold the cover against unintentional movement upwardly or sliding movement longitudinally of the basket. In the form of the invention illustrated, this is accomplished by producing marginal notched portions 6 on the transverse cleat 5 so that the sides of the notches 6 and the portion of the underlying longitudinal slat exposed by the notch operate to function as aforesaid.

This handle or bail 7 has parts for detachable connection to the basket and parts cooperating with the parts on the cover for locking the cover in position. In the particular form of the invention illustrated, the handle is provided with downwardly directed end portions 8. The free end portions of the parts 8 are directed outwardly at a downward inclination, as at 9, and thence upwardly terminating in the upturned or hooked bail-retaining portions 10. The portions 9 constitute cover-retaining parts and serve the added function of automatically lifting or raising the hand-engaging section of the bail from the cover for being readily grasped by the hand.

Holding means are provided for securing the handle or bail to the basket. To accomplish this, there may be provided, as illustrated in the drawing, a holding member or ear 11. In the form of the invention shown, this holding member 11 is secured between the plies of laminated rim 2 in any desired or usual manner and the upper portion of each holding member is formed with a slot 11′ permitting of the passage through the holding member of the hook ends 10 of the bail, such introduction being accomplished by flexing the wall of the basket to thereby twist the respective holding member whereby the part 10 may be inserted lengthwise through the opening. Each part 10 is of such length as to normally prevent accidental displacement thereof unless the holding member is twisted to an abnormal position by flexing the basket wall. The parts 10, therefore, constitute stops.

In Fig. 1, the handle or bail is shown in an upright position connected to the holding members and locking the cover in place on the basket. In this figure the portions 9 and 10 of the handle engaging the holding member 11 secure the handle to the holding member and therefore to the basket proper. The lower extremities of the portions 8 of the bail have parts of the portions 9 of the bail engaging with parts provided on the cover, in this particular instance the walls of the slots 6 and the exposed portion of the slats therebeneath, and thereby prevent any upward movement of the cover and at the same time, prevent any sliding movement of the cover lengthwise of the basket.

The cover-retaining members 9 are slidable in the openings of the holding members 11, which sliding is limited by the stops 10 at the outer ends of the resilient portions 8 at the inner ends. Said cover-retaining members extend over the cover directly from the inner faces of said members 11 and resiliently or yieldably engage the cover whereby the latter exerts an upward force on parts 9.

Figure 2:
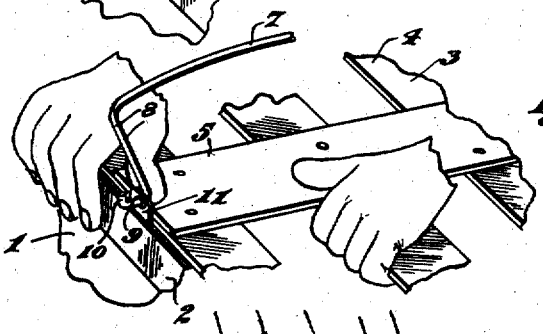
Fig. 2 is a perspective view of a portion of a basket of this invention disclosing the manipulation of the handle for releasing the cover.
Figure 3:
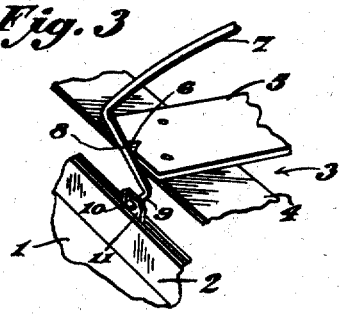
Fig. 3 is a perspective view of a portion of a basket of this invention showing the cover partly open.

Fig. 2 illustrates a movement during the removal of the cover from the basket. This may be accomplished by the operator placing one hand upon the cover, and the thumb of the other hand, as illustrated in the drawings, against the resilient, down-turned portion 8 of the bail with the fingers on the outer face of the rim. The end portion of the bail is pushed outwardly and the adjacent edge of the cover is lifted upwardly. The entire cover may then be readily slipped out longitudinally of the basket. As illustrated in Fig. 3, to insert the cover in position it is slipped partially through the upper, widest part of the bail or handle, spaced from the top of the basket, and from that position when the notched portions are in registry with the bail, may be readily forced down to closed cover position, the cover pushing the free ends of the bail outwardly to permit this movement. When the cover is in closed position, the bail snaps back into the position illustrated in Fig. 1, thus locking the cover on the basket.

Figure 4:
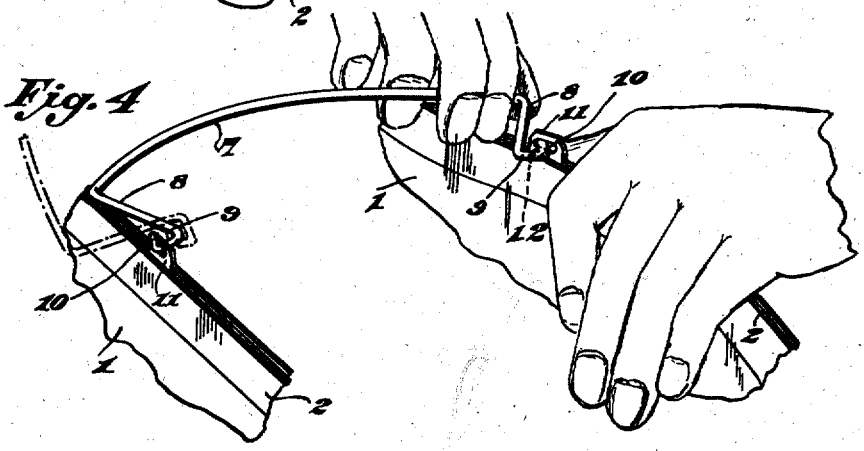
Fig. 4 is a perspective view of a portion of one side of a basket and handle illustrating the manner in which the handle is attached or detached.

To insert the bail in place on the basket or to remove it, as illustrated in Fig. 4, the operator places one hand against the inner wall of the rim of the basket and the fingers against the outer side of the wall, thereby flexing this wall. Then by manipulation of the bail with the other hand the bail can be inserted in or pulled out of the slot in the holding member, as the case may be.

In carrying the basket, the weight thereof will cause the ears or holding members 11 to ride down the outwardly and downwardly inclined portions 9 against the hooks 10. This insures the portions 9 being operatively disposed over the cover so as to secure the same in position. When the basket is not being carried, the upper wall edges of notches 6 cam upwardly on the inclined portions 9, or the heels formed at the joining of portions 9 to portions 8, and cause the bail to stand more or less erect to such an extent as to permit the hand to readily grasp the handle 7 without coming into contact with the cover. Furthermore, when unstacking baskets of fruit, the handles which were held down flat on the covers by reason of the weight of the superimposed baskets thereon will automatically become erect or lifted from their respective covers for easy grasping.

This camming erection is insured by reason of the fact that the parts 9 incline downwardly into the notches from their inner ends whereby the walls of the notches act to turn the parts 9 about pivots located in the ears 11. The wooden-slatted cover obviously possesses sufficient resiliency to insure a lifting force in the parts 9 against the top walls of the ear slots to erect the bail, which resiliency is taken advantage of when stacking baskets of fruit because the bail then folds flat down onto the cover causing the parts 9 to depress the adjacent portions of the cover to approximately the plane of the slots of the ears.

The provision of the readily attachable bail or handle renders it possible to ship the baskets proper in nested form and to attach the handles when the baskets are to be packed or used. The cooperating parts on the handle, basket and cover, permit of ready insertion of the cover through the handle and by simple downward pressure forcing the free ends of the handle outwardly, permit the cover to snap instantaneously into closed cover position where it is automatically locked by the handle. No part of the bail extends beneath the cover, or into the basket, so that the fruit is protected against being bruised or cut by inwardly projecting bail parts.

The connection between the handle or bail and the basket and cover permit the handle when in position to tilt or swing angularly with the result that when filled baskets of fruit are packed in a truck or car for shipment, the weight of the superposed baskets will depress the handles and permit of utilization for the carrying of fruit in the baskets, of the space heretofore taken up by the handles of the prior art construction.

What is claimed is:

1. In a basket structure, an open top basket embodying flexible side walls and having a laminated rim at its top, a removable cover for said open top resting upon the upper edge of said rim, said cover including a transverse cleat having V-shaped notches at its opposite ends, bail-retaining plates secured between the plies of said rim and projecting above said rim, the projecting portions of the plates being provided with horizontally disposed elongated slots disposed in registry with the aforesaid notches, and a resilient wire carrying bail, the downwardly directed end portions of which are bent inwardly towards each other, the free ends thereof being bent outwardly at substantial right angles, said right angularly bent portion being disposed in said notches and extending through and beyond said slots and terminating in upturned hooks.

2. In a basket structure, an open type basket embodying flexible side walls, holding members secured adjacent the upper edges of said walls and each having an elongated opening therethrough with its major axis substantially parallel to the upper edge of the basket, and a bail having downwardly extending end portions, the lower terminals of said portions being deflected outwardly through the openings of said holding members, the protruding extremities of said terminal portions being angularly directed to form stop parts, each angularly directed stop part being of greater length than the size of the opening through the adjacent holding member and insertible lengthwise through said holding member opening whereby said part is normally held against displacement from said holding member, the latter being adapted for disposition at an angle to said stop part upon the flexing of the respectve side wall for lengthwise introduction of said part through said holding member opening.

3. A basket comprising a body portion, opposed upright bail receiving members provided with aligned apertures disposed on said body portion, and a bail extending between the apertures, said bail being formed with downwardly extending portions, said downwardly extending portions merging into laterally extending portions passing through said apertures, said laterally extending portions merging into angularly disposed end portions of the bail, and means adjacent the laterally extending portions cooperating with said bail to force said bail into an upright position upon the release of externally applied pressure, said apertures being of such size to permit of the rotative movement of the bail toward and adjacent the body portion of the basket upon the application of pressure.

4. A basket comprising a body portion, opposed upright bail receiving members provided with aligned apertures disposed on the body portion, and a bail extending between the apertures, said bail being formed with downwardly extending portions, inclined portions passing through the apertures, and upwardly extending portions, and means adapted to be disposed adjacent said inclined portions for cooperative engagement therewith to force the bail into an upright position upon release of external pressure, said apertures being so dimensioned as to permit of the rotative movement of the bail toward the body portion of the basket upon the application of pressure.

5. A basket comprising a body portion, opposed upright bail receiving members formed with aligned apertures secured to the body portion, and bail adapted to extend between the upright members, said bail being bent adjacent each side of the basket to provide downwardly extending portions adapted to be disposed within the inner faces of the upright members, said downwardly extending portions merging into downwardly and outwardly extending portions of relatively short length as compared to the length of the downwardly extending portions, said downwardly and outwardly extending portions being adapted to pass through the aligned apertures, said downwardly and outwardly extending portions merging into upturned end portions adapted to be positioned exteriorly of the upright members, the apertures in said members being of such size as to permit of the pivotal movement of said downwardly and outwardly extending portions, with respect to said upright members, and means associated with the basket body portion and said downwardly and outwardly extending portions of the bail to maintain the bail in a normally upright position.

6. A basket comprising a body portion, opposed upright bail receiving members formed with aligned apertures secured to the body portion, and a bail adapted to extend between the upright members, said bail being bent adjacent each side of the basket to provide downwardly extending portions adapted to be disposed within the inner faces of the upright members, said downwardly extending portions merging into downwardly and outwardly extending portions of relatively short length as compared to the length of the downwardly extending portions, said downwardly and outwardly extending portions being adapted to pass through the aligned apertures, said downwardly and outwardly extending portions merging into upturned end portions adapted to be positioned exteriorly of the upright members, the apertures in said members being of such size as to permit of the pivotal movement of said downwardly and outwardly extending portions, with respect to said upright members, and means disposed immediately beneath said downwardly and outwardly extending portions for causing said bail to assume an upright position when said bail is relieved of external pressure.

7. A basket comprising a body portion, opposed upright bail receiving members formed with aligned apertures secured to the body portion, and a bail adapted to extend between the upright members, said bail being bent adjacent each side of the basket to provide downwardly extending portions adapted to be disposed within the inner faces of the upright members, said downwardly extending portions merging into downwardly and outwardly extending portions of relatively short length as compared to the length of the downwardly extending portions, said downwardly and outwardly extending portions being adapted to pass through the aligned apertures, said downwardly and outwardly extending portions merging into upturned end portions adapted to be positioned exteriorly of the upright members, the apertures in said members being of such size as to permit of the pivotal movement of said downwardly and outwardly extending portions, with respect to said upright members, a cover for the body portion of the basket adapted to be positioned between the upright members, said cover having means formed thereon for cooperating with said downwardly and outwardly extending portions on the bail for returning the bail to an upright position upon the release of external pressure.

8. A basket comprising a body portion, bail receiving lugs formed with apertures disposed on opposite sides of the body portion, a cover for the basket, said cover being formed with opposed notches in the margin thereof adapted to be aligned with said lugs when said cover is positioned on the basket, and a bail extending between the lugs, said bail being formed with downwardly extending portions, said downwardly extending portions merging into laterally extending portions passing through the apertures in the lugs, and said laterally extending portions merging into angularly disposed end portions, the apertures being of such size as to permit of the movement of the bail toward and adjacent the body portion of the basket, when the cover is assembled on the body portion, said bail further entering said notches on the cover to lock the cover in place.

FOREST J. BRAINARD.